United States Patent
Sekine et al.

(10) Patent No.: US 10,228,888 B2
(45) Date of Patent: Mar. 12, 2019

(54) SYSTEM, METHOD, AND NON-TRANSITORY RECORDING MEDIUM FOR DETERMINING LIFETIMES OF COMPONENTS OF MULTIFUNCTION PERIPHERALS

(71) Applicants: Takeyoshi Sekine, Tokyo (JP); Takenori Oku, Tokyo (JP); Hiroshi Nishida, Kanagawa (JP); Satoshi Hatanaka, Kanagawa (JP); Kenji Ueda, Kanagawa (JP); Yasushi Nakazato, Tokyo (JP); Fumihiro Nagano, Kanagawa (JP); Yuuji Nagamatsu, Tokyo (JP); Ryusuke Mase, Kanagawa (JP)

(72) Inventors: Takeyoshi Sekine, Tokyo (JP); Takenori Oku, Tokyo (JP); Hiroshi Nishida, Kanagawa (JP); Satoshi Hatanaka, Kanagawa (JP); Kenji Ueda, Kanagawa (JP); Yasushi Nakazato, Tokyo (JP); Fumihiro Nagano, Kanagawa (JP); Yuuji Nagamatsu, Tokyo (JP); Ryusuke Mase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/572,229

(22) PCT Filed: Jun. 7, 2016

(86) PCT No.: PCT/JP2016/002757
§ 371 (c)(1),
(2) Date: Nov. 7, 2017

(87) PCT Pub. No.: WO2016/203737
PCT Pub. Date: Dec. 22, 2016

(65) Prior Publication Data
US 2018/0121139 A1     May 3, 2018

(30) Foreign Application Priority Data

Jun. 17, 2015 (JP) .................... 2015-121654

(51) Int. Cl.
*H04N 1/00* (2006.01)
*G06F 3/12* (2006.01)
(Continued)

(52) U.S. Cl.
CPC .............. *G06F 3/121* (2013.01); *B41J 29/38* (2013.01); *G03G 15/5079* (2013.01);
(Continued)

(58) Field of Classification Search
None
See application file for complete search history.

(56) References Cited

U.S. PATENT DOCUMENTS

| 5,708,917 A | 1/1998 | Kawai et al. |
| 7,243,045 B2 | 7/2007 | Uwatoko et al. |

(Continued)

FOREIGN PATENT DOCUMENTS

| JP | 2000-259222 | 9/2000 |
| JP | 2004-037941 | 2/2004 |

(Continued)

OTHER PUBLICATIONS

Extended European Search Report for 16811212.6 dated May 4, 2018.
(Continued)

*Primary Examiner* — Andrew H Lam
(74) *Attorney, Agent, or Firm* — IPUSA, PLLC

(57) ABSTRACT

An information processing system includes one or more information processing apparatuses for determining lifetimes of components, to be replaced by preventive maintenance, of respective electric devices. The information pro-
(Continued)

cessing system includes a leading variable specifying unit configured to specify, based on variables that represent use states of the electric devices and failure data of the electric devices which have been obtained from the electric devices, a plurality of leading variables relevant to the lifetimes of the components; a lifetime matrix creating unit configured to classify a plurality of values of each of the leading variables into sections to create a lifetime matrix in which the lifetimes of the components are set with respect to combinations of the sections each of which relates to a different leading variable; and a lifetime outputting unit configured to determine the lifetimes of the components with respect to the respective electric devices.

10 Claims, 16 Drawing Sheets

(51) Int. Cl.
  *B41J 29/38* (2006.01)
  *G03G 15/00* (2006.01)
  *G06F 11/30* (2006.01)
(52) U.S. Cl.
  CPC ......... *G03G 15/553* (2013.01); *G06F 3/1229* (2013.01); *G06F 3/1234* (2013.01); *G06F 3/1273* (2013.01); *G06F 11/30* (2013.01); *H04N 1/00* (2013.01); *H04N 1/00015* (2013.01); *H04N 1/00039* (2013.01); *H04N 1/00068* (2013.01); *H04N 2201/0094* (2013.01)

(56) References Cited

U.S. PATENT DOCUMENTS

| | | | |
|---|---|---|---|
| 2010/0053671 A1 | 3/2010 | Seta et al. | |
| 2011/0202288 A1 | 8/2011 | Kato et al. | |
| 2012/0163839 A1* | 6/2012 | Oda | G03G 15/553 |
| | | | 399/24 |

FOREIGN PATENT DOCUMENTS

| | | |
|---|---|---|
| JP | 2007-256356 | 10/2007 |
| JP | 4538845 | 9/2010 |

OTHER PUBLICATIONS

International Search Report dated Aug. 16, 2016 in PCT/JP2016/002757 filed on Jun. 7, 2016.

* cited by examiner

[Fig. 1]
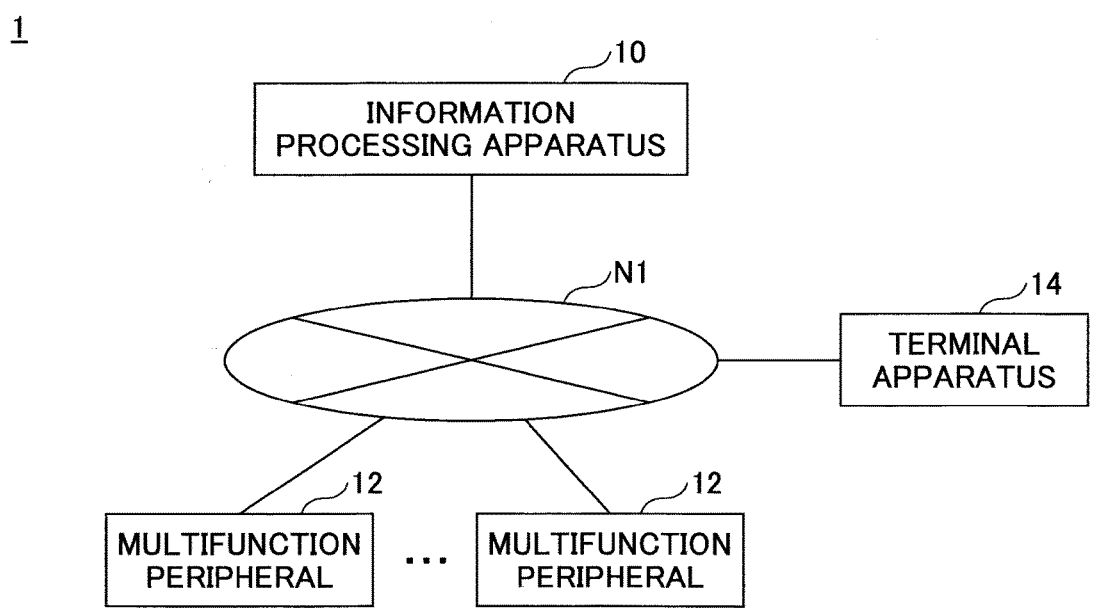

[Fig. 2]
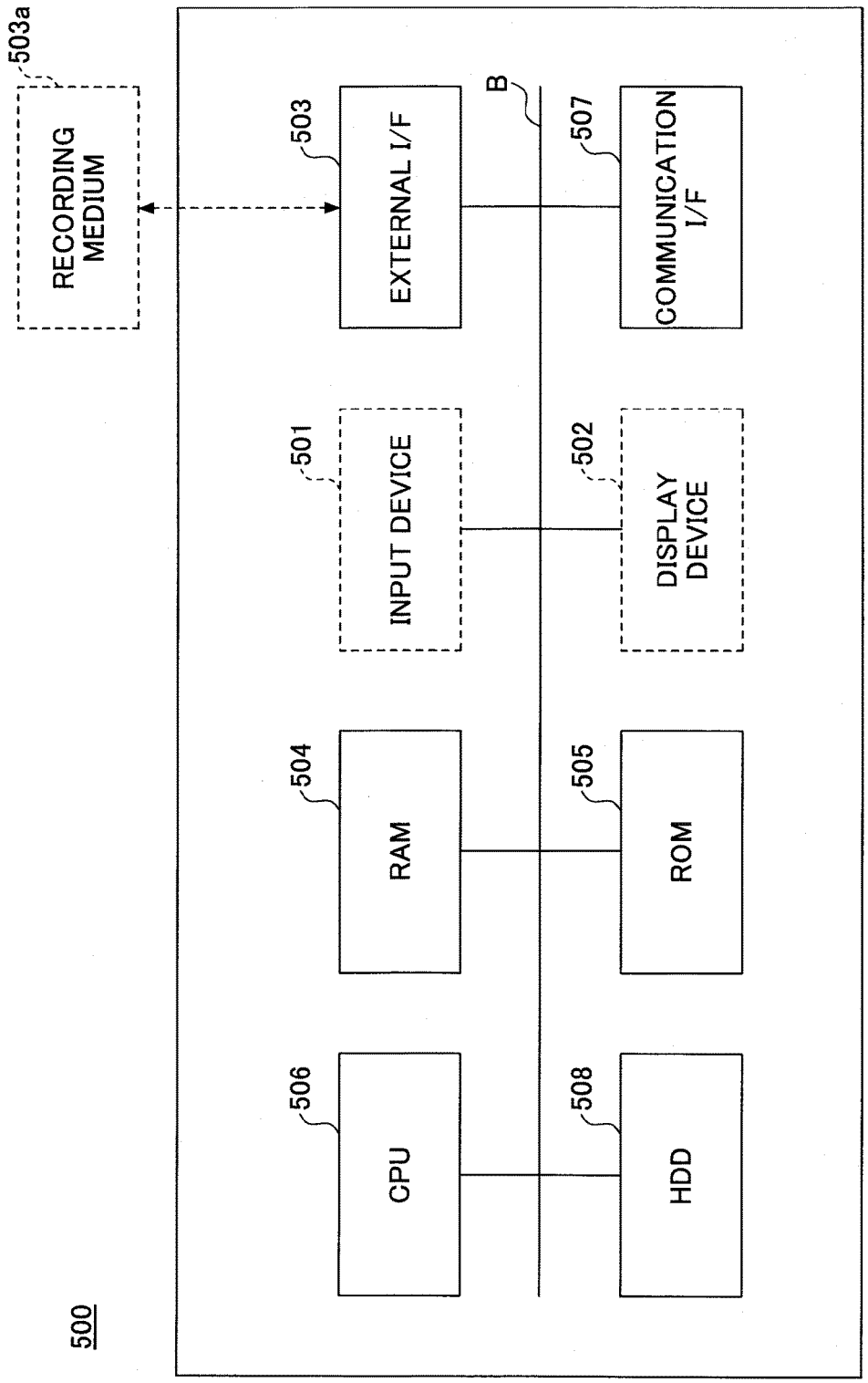

[Fig. 3]
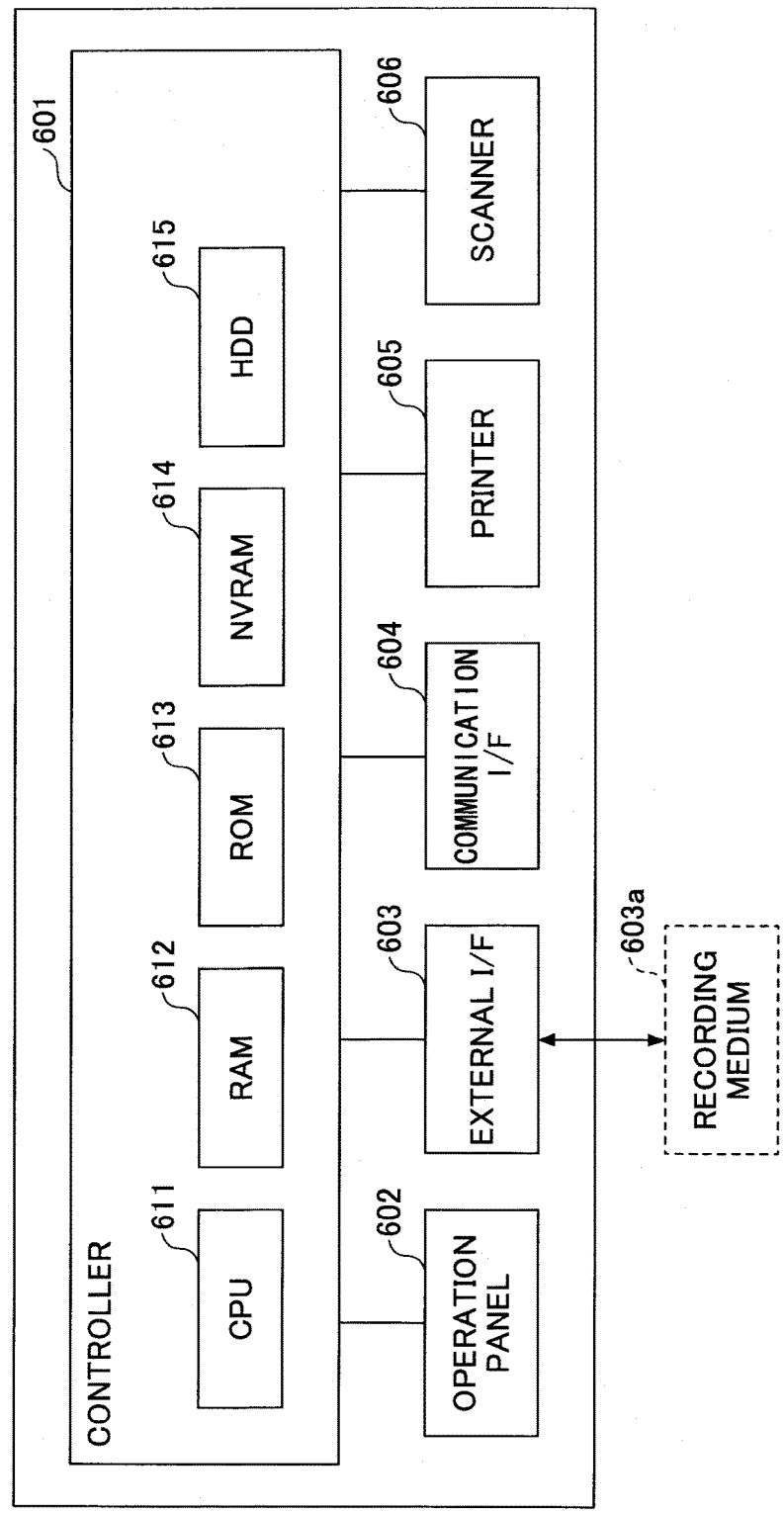

[Fig. 4]
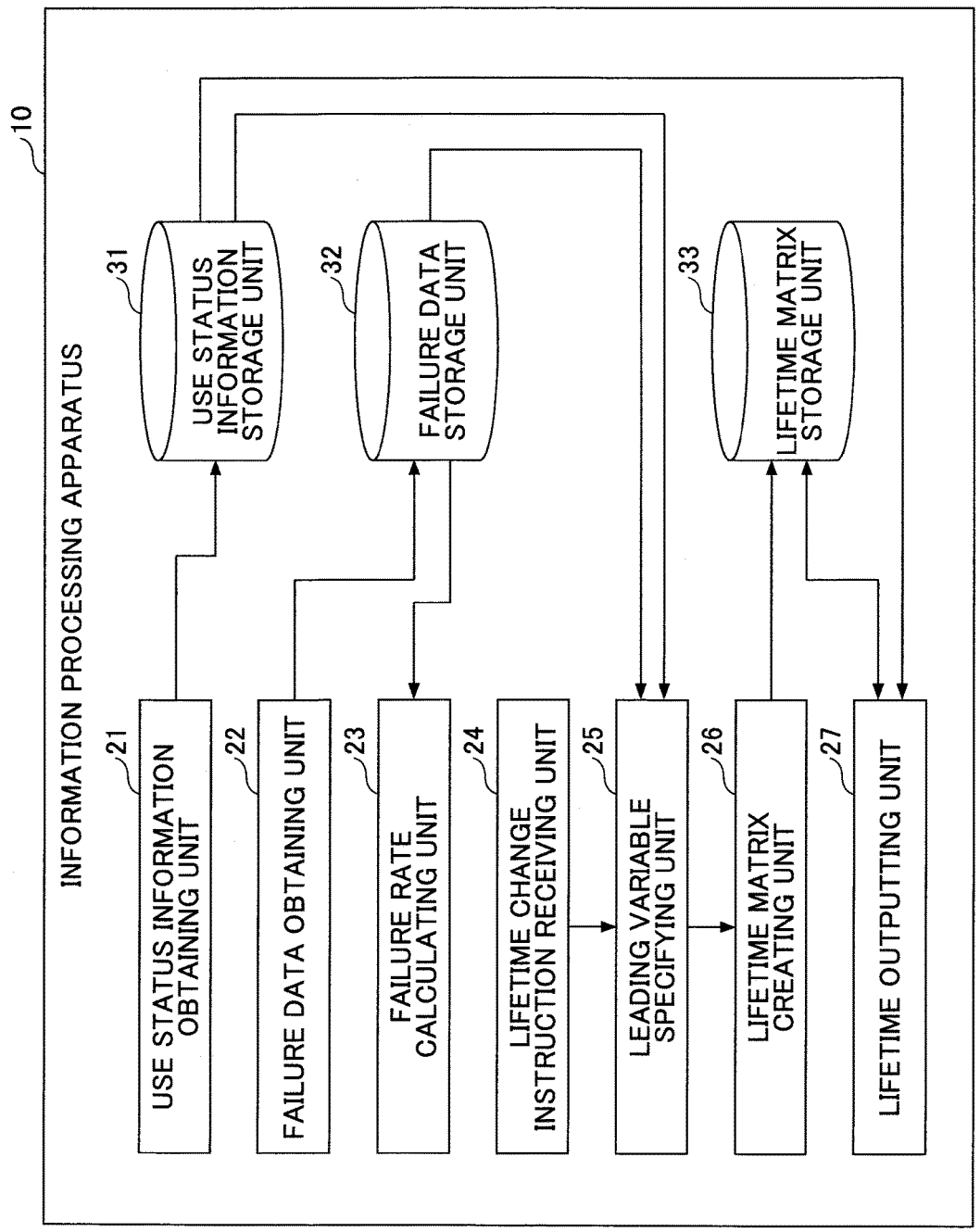

[Fig. 5]
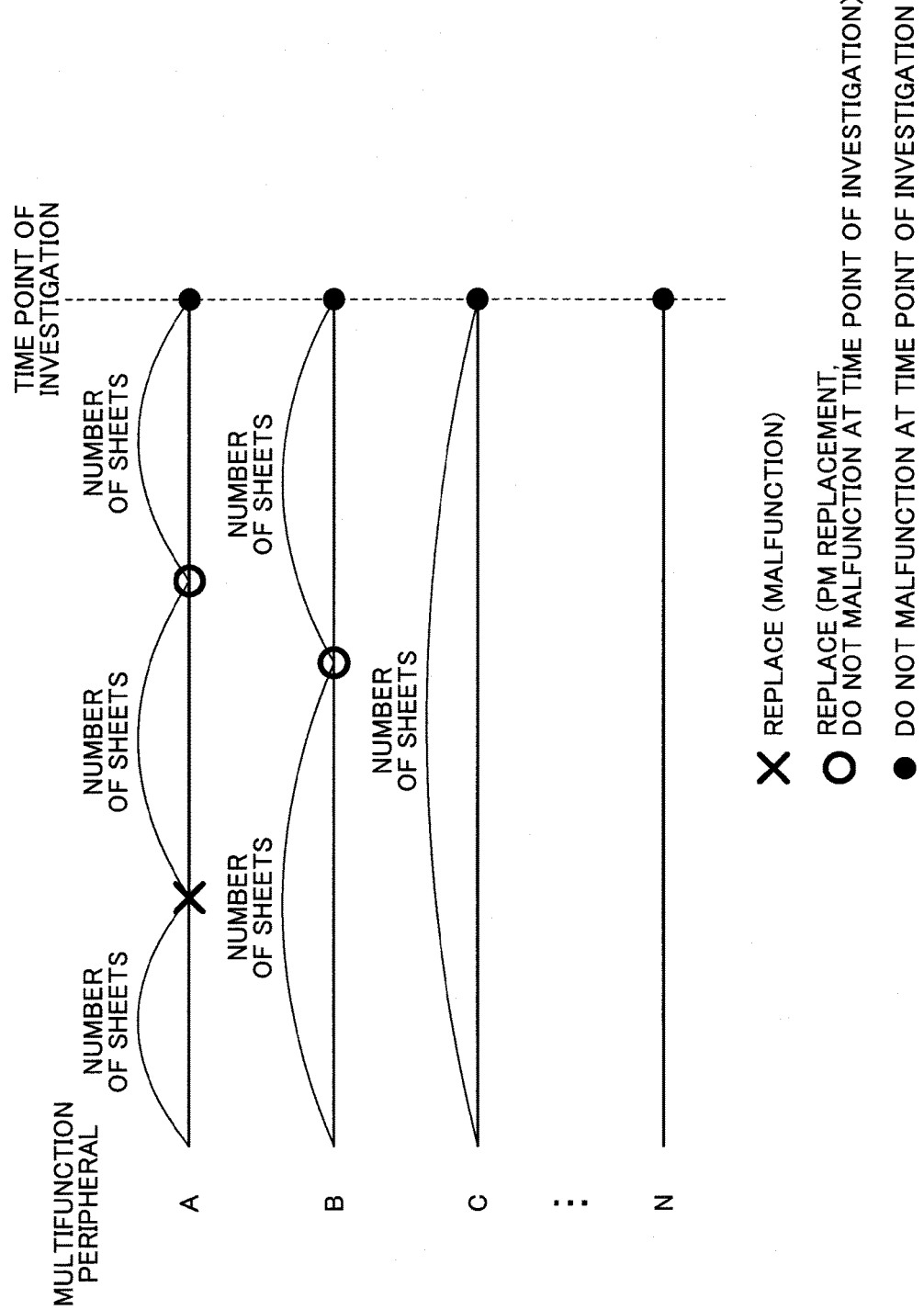

[Fig. 6]
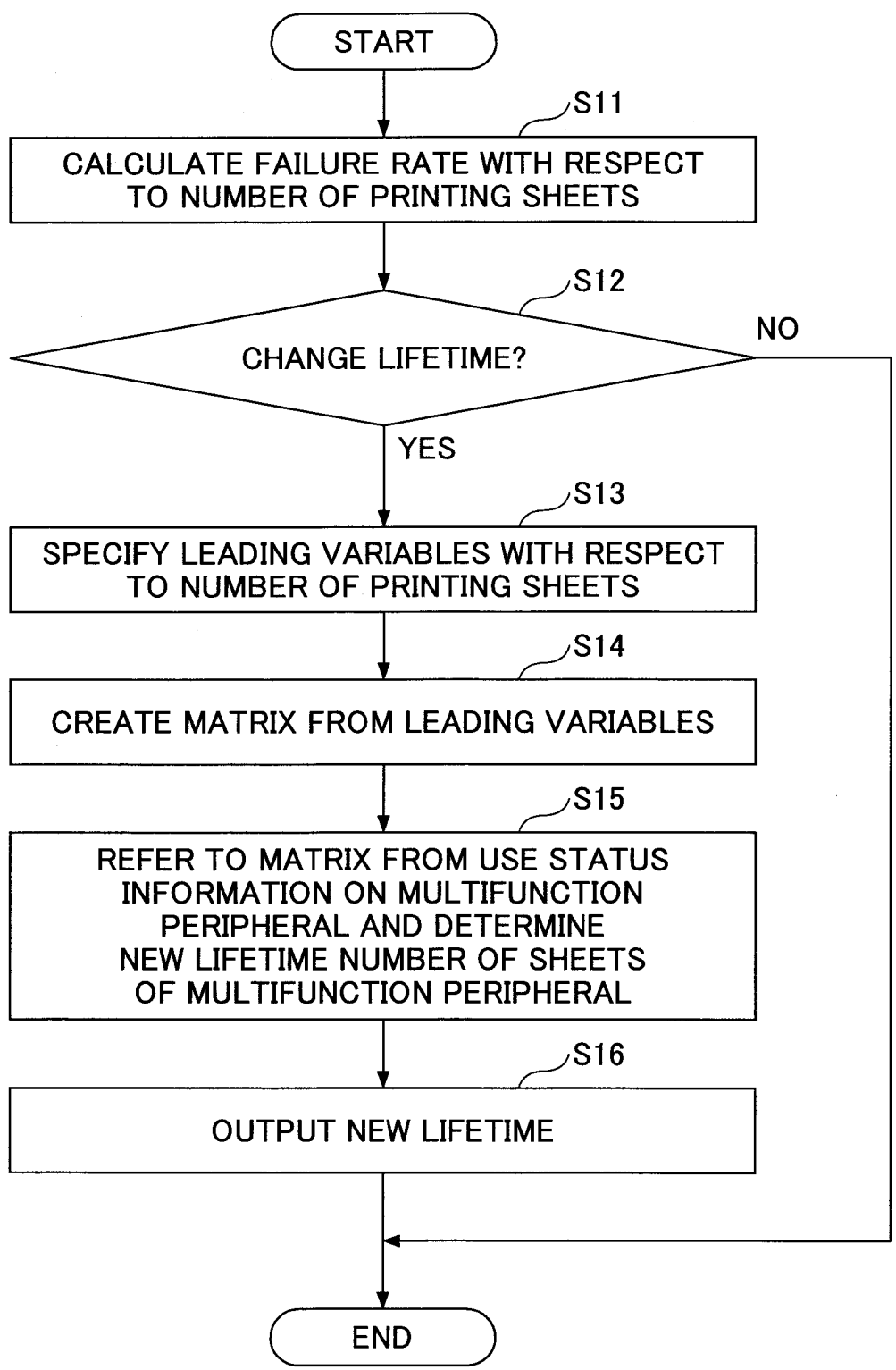

[Fig. 7]
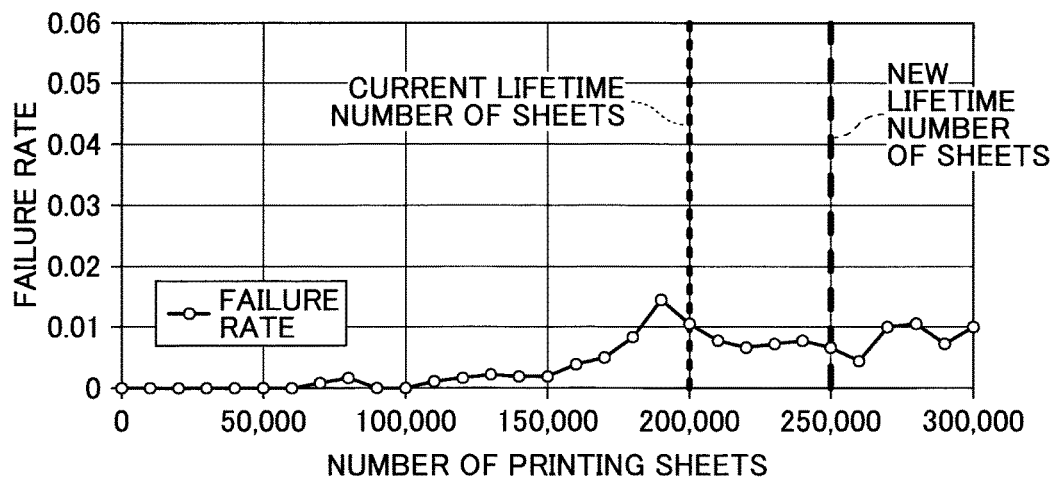
[Fig. 8]
| DEVICE NAME | ACV | NUMBER OF SHEETS S/J | CUMULATIVE NUMBER OF PRINTING SHEETS | SHEETS/DAY |
|---|---|---|---|---|
| A | 8.4K | 1.1K | 200K | 10K |
| B | 10.5K | 2.5K | 220K | 5K |
| C | 12.5K | 2.5K | 180K | 1K |
| D | 15.9K | 4.5K | 150K | 2K |
| E | 20.5K | 1.1K | 200K | 8K |
| ⋮ | ⋮ | ⋮ | ⋮ | ⋮ |

[Fig. 9]
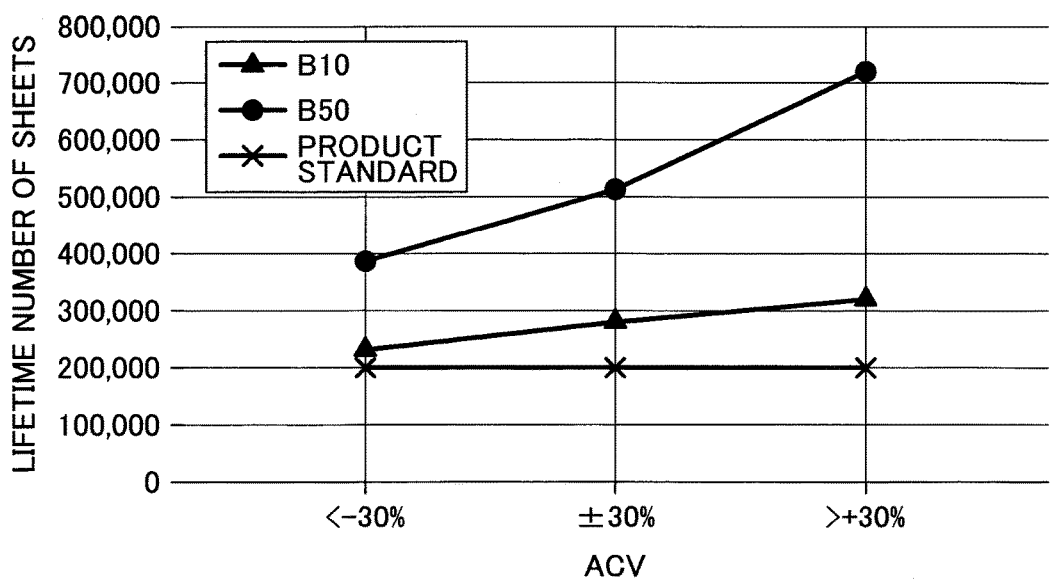
[Fig. 10]
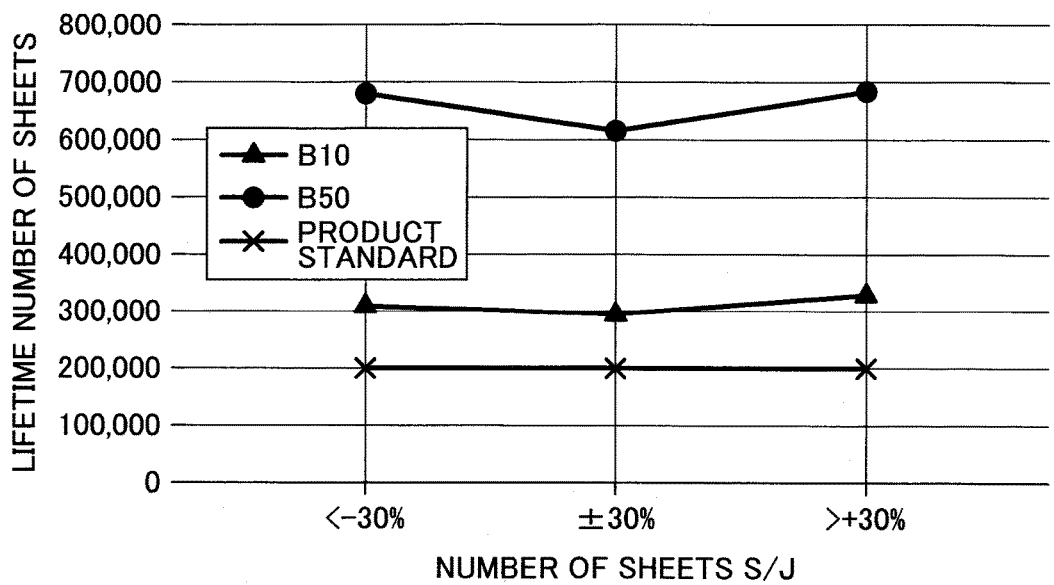

[Fig. 11]
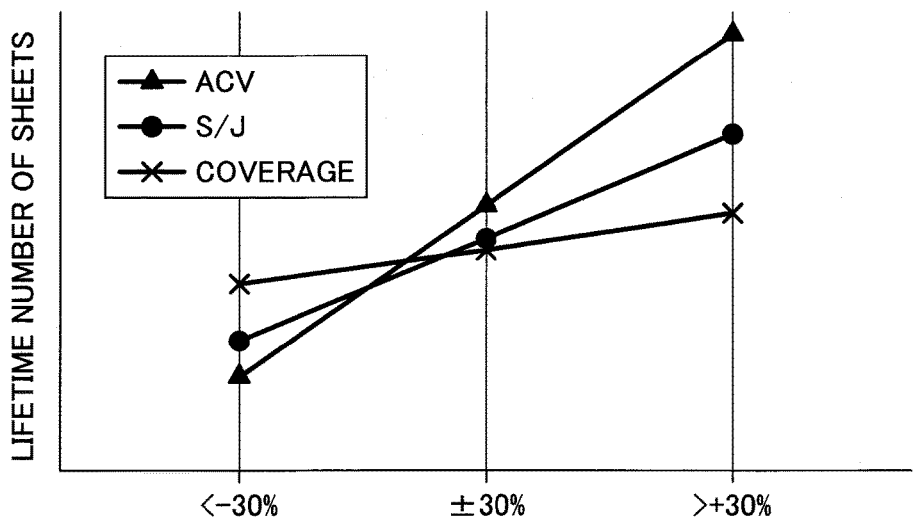
[Fig. 12]
PM REPLACEMENT COMPONENT A
CURRENT LIFETIME NUMBER OF SHEETS: 200,000
NEW LIFETIME NUMBER OF SHEETS: 250,000
| | | | ACV | | |
|---|---|---|---|---|---|
| | | | <8.4K | 8.4K–15.6K | >15.6K |
| | | | <−30% | ±30% | >+30% |
| S/J | <2.1 | <−30% | 222,865 | 234,326 | 384,621 |
| | 2.1–3.9 | ±30% | 223,730 | 250,000 | 274,411 |
| | >3.9 | >+30% | 306,109 | 265,503 | 294,027 |
SHORTER THAN CENTRAL VALUE
EXTENDABLE FROM CENTRAL VALUE

[Fig. 13]

| MULTIFUNCTION PERIPHERAL A | PM REPLACEMENT COMPONENT B | ACV |||
|---|---|---|---|---|
| | | | <-30% | ±30% | >+30% |
| | S/J <-30% | 100 | 150 | 210 |
| | S/J ±30% | 150 | 200 | 250 |
| | S/J >+30% | 190 | 250 | 300 |
| | PM REPLACEMENT COMPONENT C | ACV |||
| | | <-30% | ±30% | >+30% |
| | S/J <-30% | 100 | 130 | 180 |
| | S/J ±30% | 120 | 150 | 200 |
| | S/J >+30% | 130 | 180 | 220 |
| | PM REPLACEMENT COMPONENT D | COVERAGE |||
| | | <-30% | ±30% | >+30% |
| | S/J <-30% | 350 | 400 | 500 |
| | S/J ±30% | 350 | 400 | 600 |
| | S/J >+30% | 400 | 500 | 600 |
| | (SELECT COVERAGE AND S/J) ||||
| | PM REPLACEMENT COMPONENT E ⋮ ||||
| MULTIFUNCTION PERIPHERAL B | PM REPLACEMENT COMPONENT A ⋮ ||||
| ⋮ | ⋮ ||||
| MULTIFUNCTION PERIPHERAL X | ||||

▒ SHORTER THAN CENTRAL VALUE
▓ EXTENDABLE FROM CENTRAL VALUE

[Fig. 14]
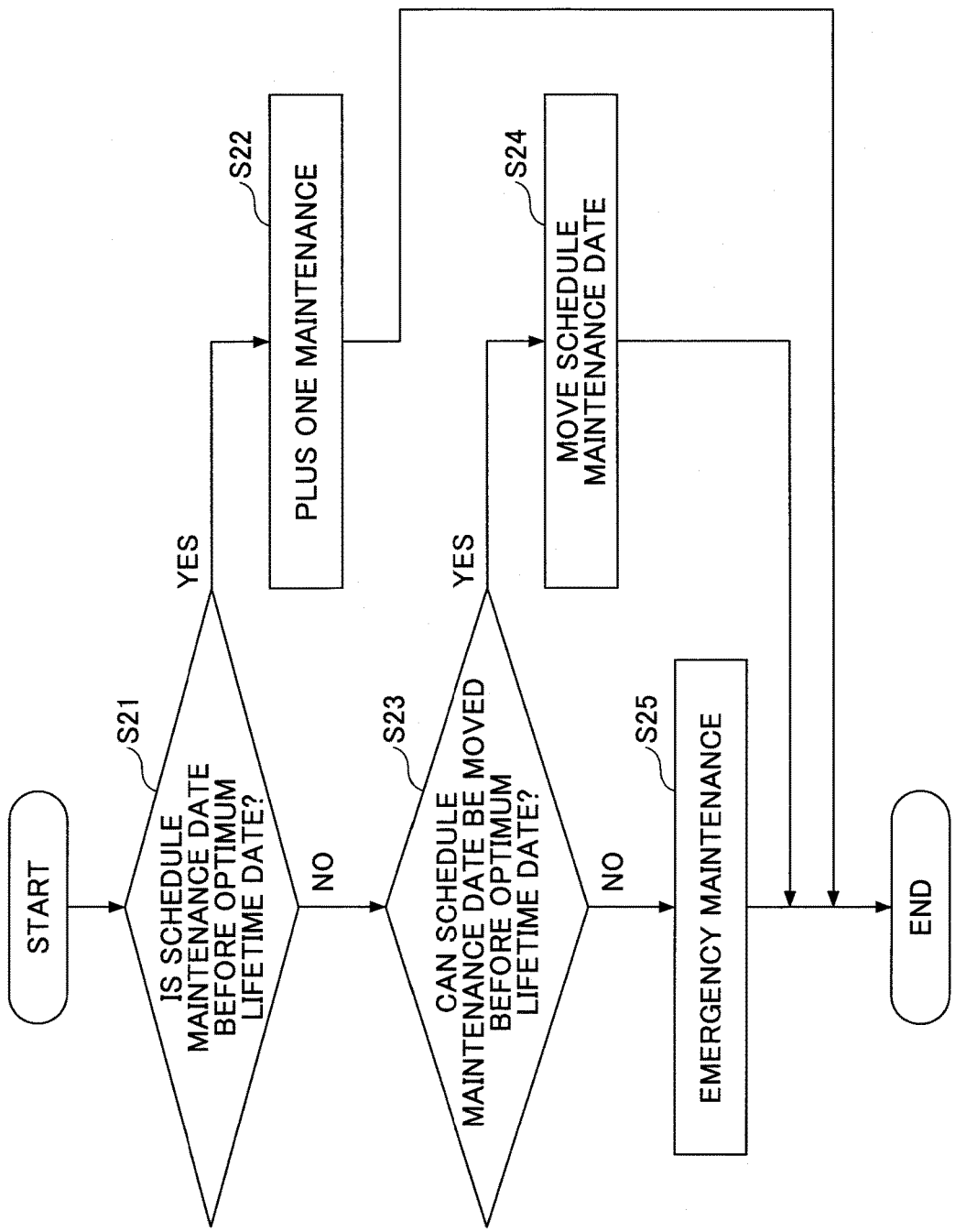

[Fig. 15]
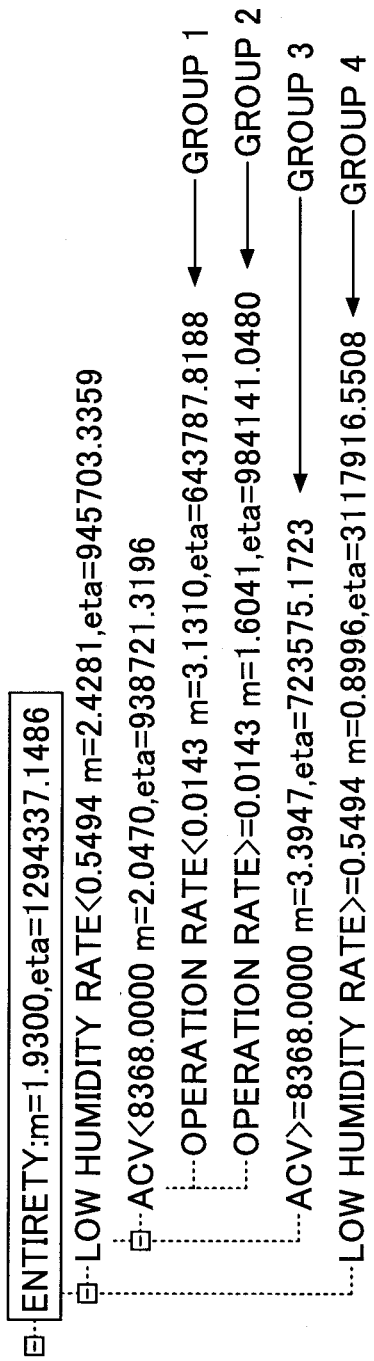

[Fig. 16]
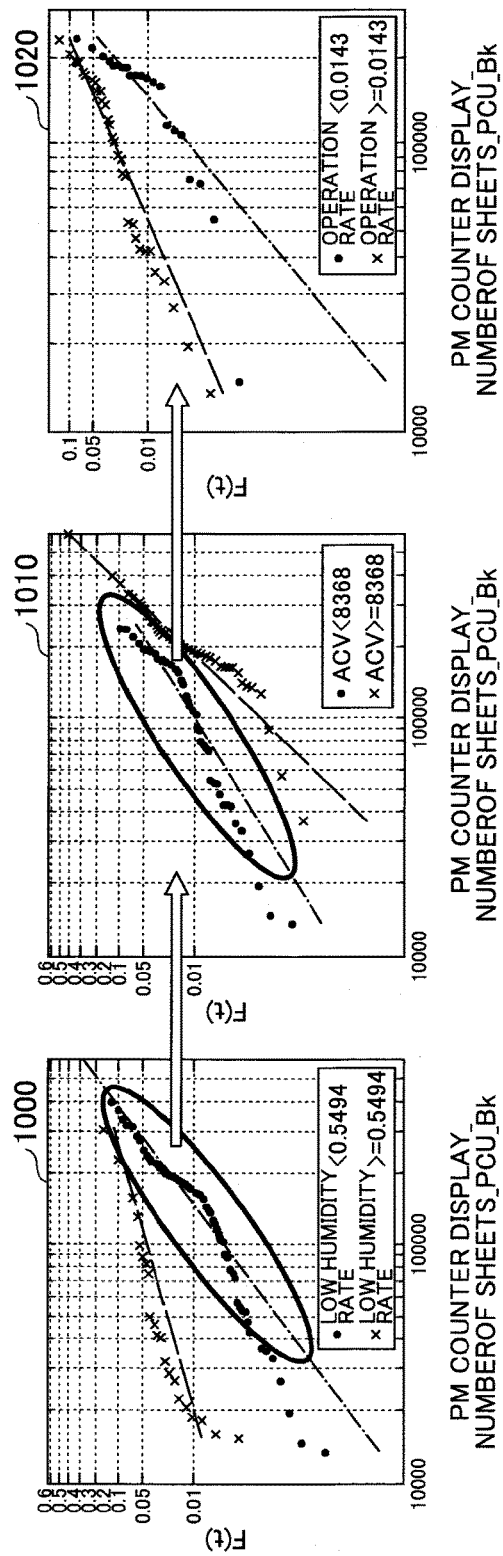

[Fig. 17A]
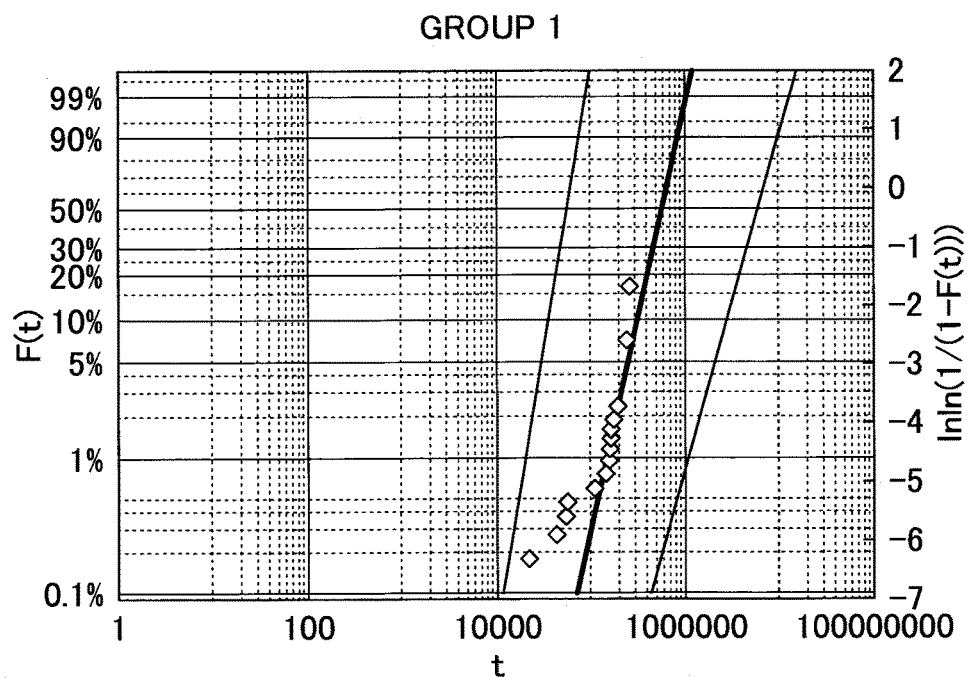
[Fig. 17B]
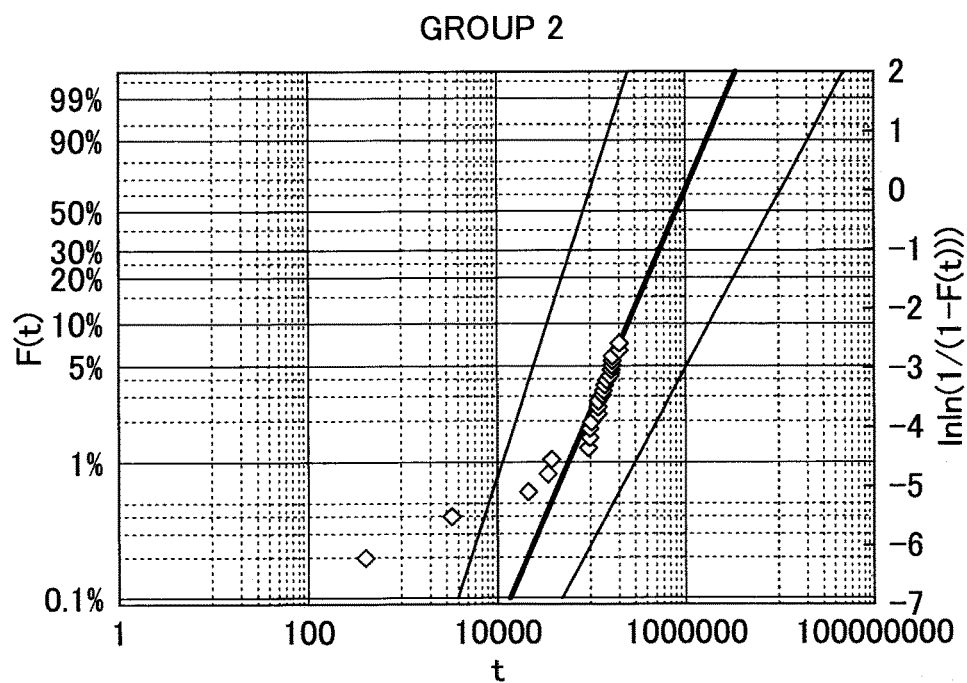

[Fig. 17C]
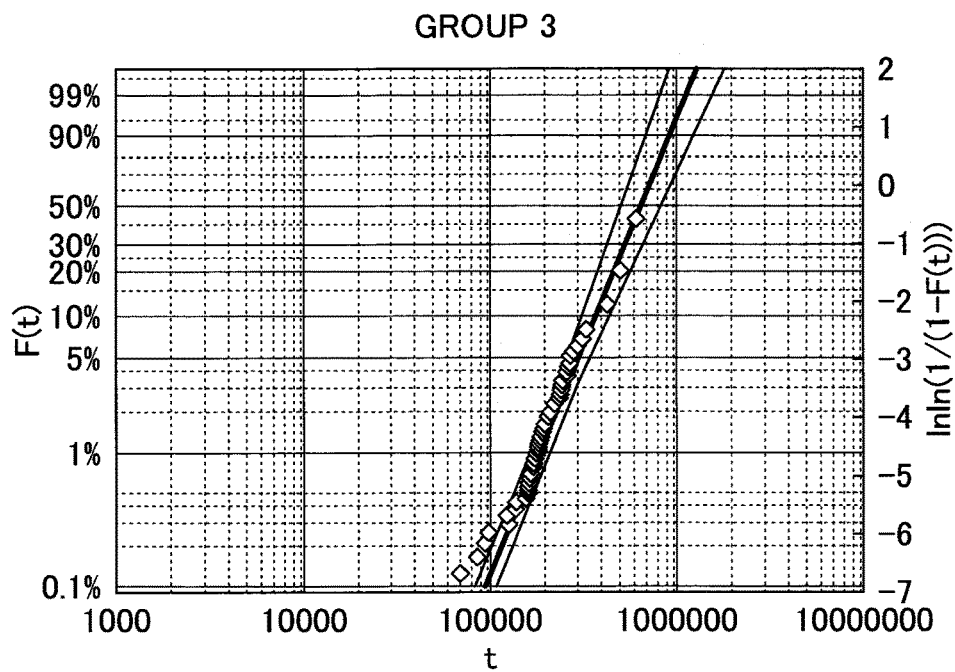
[Fig. 17D]
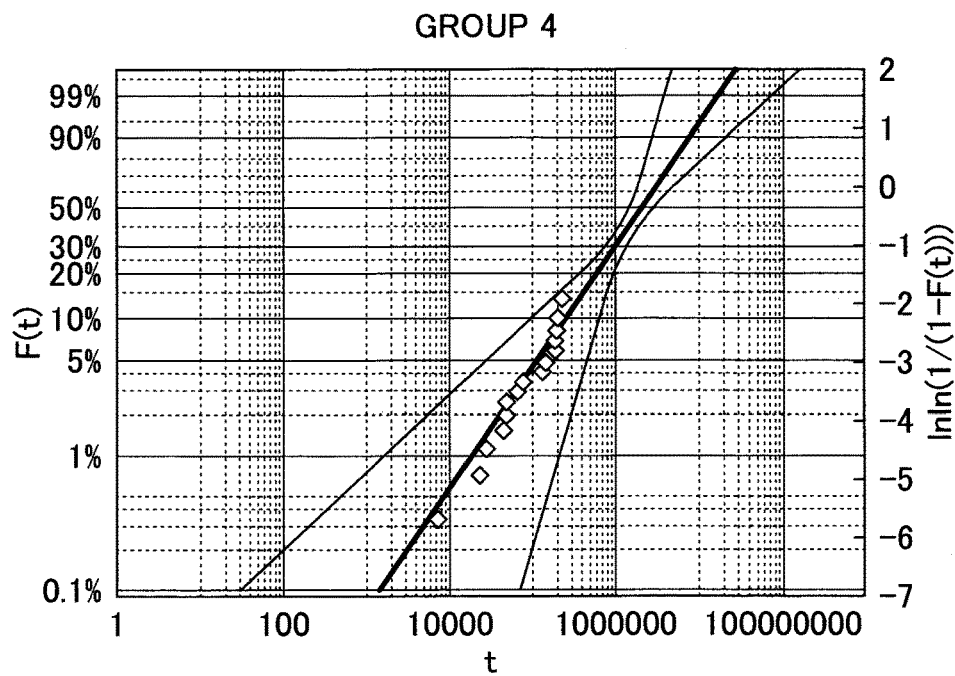

[Fig. 18]

|  | LIFETIME (B20) |
|---|---|
| GROUP 1 | 237,180 |
| GROUP 2 | 206,131 |
| GROUP 3 | 250,126 |
| GROUP 4 | 202,604 |

OLD LIFETIME NUMBER OF SHEETS :200K
NEW LIFETIME NUMBER OF SHEETS :250K

US 10,228,888 B2

SYSTEM, METHOD, AND NON-TRANSITORY RECORDING MEDIUM FOR DETERMINING LIFETIMES OF COMPONENTS OF MULTIFUNCTION PERIPHERALS

TECHNICAL FIELD

The present invention relates to an information processing system, a component lifetime determining method, and a non-transitory recording medium.

BACKGROUND ART

In electric devices such as copy machines and printers, lifetimes of components were determined and preventive maintenance (PM) to replace the components based on the lifetimes has been performed even if the components do not malfunction. The components to be replaced based on the preventive maintenance are called lifetime components and/or PM replacement components, for example.

Patent Literature 1 discloses an image forming apparatus management system in which each image forming apparatus transmits status information that represents its own status to a management apparatus, and the management apparatus analyzes contents of the received status information. Then, the management apparatus selectively transmits information relating to maintenance or repair of the image forming apparatus to each terminal apparatus.

CITATION LIST

Patent Literature

[PTL 1] Japanese Unexamined Patent Application Publication No. 2004-37941

SUMMARY OF INVENTION

Technical Problem

For example, the lifetimes of the components to be replaced by the preventive maintenance are determined by product standards. However, the lifetimes of the components to be replaced by the preventive maintenance may fluctuate depending on a way of using the electric device. Thus, in the electric devices of the related art, there may be a case in which components cannot be replaced before the failure or a case in which components having sufficient lifetimes are uneconomically replaced.

Solution to Problem

According to an aspect of the present disclosure, an information processing system includes one or more information processing apparatuses for determining lifetimes of components, to be replaced by preventive maintenance, of respective electric devices. The information processing system includes a leading variable specifying unit configured to specify, based on variables that represent use states of the electric devices and failure data of the electric devices which have been obtained from the electric devices including the components, a plurality of leading variables relevant to the lifetimes of the components; a lifetime matrix creating unit configured to classify a plurality of values of each of the leading variables into sections to create a lifetime matrix in which the lifetimes of the components are set with respect to combinations of the sections each of which relates to a different leading variable; and a lifetime outputting unit configured to obtain, from the lifetime matrix, the lifetimes of the components corresponding to the combinations of the sections each of which relates to the different leading variable to determine the lifetimes of the components with respect to the respective electric devices.

Advantageous Effects of Invention

According to one embodiment of the present disclosure, it becomes possible to determine lifetimes of components with respect to respective electric devices.

BRIEF DESCRIPTION OF DRAWINGS

FIG. 1 is a schematic diagram illustrating an example of an information processing system according to a first embodiment;

FIG. 2 is a block diagram illustrating an example of a hardware configuration of a computer according to the first embodiment;

FIG. 3 is a block diagram illustrating an example of a hardware configuration of a multifunction peripheral according to the first embodiment;

FIG. 4 is a block diagram illustrating an example of processing blocks of an information processing apparatus according to the first embodiment;

FIG. 5 is a diagram of an example illustrating failure data of PM replacement components with respect to the respective multifunction peripherals;

FIG. 6 is a flowchart illustrating an example of processes for determining and outputting a lifetime of the PM replacement component;

FIG. 7 is a graph illustrating an example of failure rates with respect to the number of printing sheets;

FIG. 8 is a table illustrating an example of use status information;

FIG. 9 is a graph illustrating an example of relation between an ACV and the lifetime number of sheets;

FIG. 10 is a graph illustrating an example of relation between the number of sheets S/J and the lifetime number of sheets;

FIG. 11 depicts graphs illustrating an example of relation between values of three leading variable candidates and the lifetime number of sheets of the PM replacement component;

FIG. 12 is an example of the lifetime matrix;

FIG. 13 depicts other examples of lifetime matrixes;

FIG. 14 is a flowchart illustrating an example for selecting maintenance in accordance with an optimum lifetime date;

FIG. 15 is a diagram illustrating an example of a result of a Weibull decision tree analysis of data for learning;

FIG. 16 depicts graphs illustrating examples of failure rates with respect to the number of printing sheets after the data for learning is divided by a low humidity rate, the ACV, and an operation rate;

FIG. 17A is a graph illustrating, for a group 1, the failure rates with respect to the number of printing sheets of data for learning and the failure rates with respect to the number of printing sheets of data for verification;

FIG. 17B is a graph illustrating, for a group 2, the failure rates with respect to the number of printing sheets of data for learning and the failure rates with respect to the number of printing sheets of data for verification;

FIG. 17C is a graph illustrating, for a group 3, the failure rates with respect to the number of printing sheets of data for learning and the failure rates with respect to the number of printing sheets of data for verification;

FIG. 17D is a graph illustrating, for a group 4, the failure rates with respect to the number of printing sheets of data for learning and the failure rates with respect to the number of printing sheets of data for verification; and FIG. 18 is a table illustrating an example of the lifetime number of sheets calculated for the respective groups.

DESCRIPTION OF EMBODIMENTS

In the following, embodiments of the present disclosure will be described with reference to the accompanying drawings.

First Embodiment

<System Configuration>

FIG. 1 is a schematic diagram illustrating an example of an information processing system 1 according to a first embodiment. In the information processing system 1, an information processing apparatus 10, a plurality of multifunction peripherals 12, a terminal apparatus 14 are connected via a network N1 such as the Internet.

The multifunction peripheral 12 is an example of an electric device. The multifunction peripheral 12 performs image forming processing such as scanning, printing (output), and faxing (fax communication). In addition to an image forming apparatus such as the multifunction peripheral, a scanner, a printer, a fax machine, a projector, and an electronic white board for example, various electric devices including components (referred to as PM replacement components hereinafter) to be replaced by preventive maintenance may be used as the electric device according to the first embodiment.

The information processing apparatus 10 obtains a plurality of variables (information on use status) relating to the multifunction peripherals 12 and failure data of the PM replacement components. The information processing apparatus 10 obtains the plurality of variables relating to the multifunction peripherals 12 and the failure data of the PM replacement components via the network N1. Further, the information processing apparatus 10 may read the plurality of variables relating to the multifunction peripherals 12 and the failure data of the PM replacement components from a recording medium such as a USB memory into which a customer engineer (CE) records the variables and the data from the multifunction peripheral(s) 12.

The plurality of variables relating to the multifunction peripherals 12 may include the average number of copies (average copy volume (ACV)), the number of printing sheets per job (number of sheets S/J), and an image area (coverage). Further, the plurality of variables relating to the multifunction peripherals 12 may include a low humidity rate and an operation rate.

The information processing apparatus 10 uses use status information and failure data of the PM replacement components of all the multifunction peripherals 12 to determine, as described later, optimum lifetimes of the PM replacement components with respect to the respective multifunction peripherals 12. In other words, the information processing apparatus 10 can determine an optimum lifetime of a target PM replacement component with respect to each multifunction peripheral 12. Also, the information processing apparatus 10 can determine the optimum lifetimes of the PM replacement components, included in each multifunction peripheral 12, with respect to each multifunction peripheral 12.

The terminal apparatus 14 is an apparatus that a user operates such as a customer engineer who replaces the PM replacement components and a user who instructs (orders) the replacement. For example, the terminal apparatus 14 may be a personal computer (PC), a tablet type terminal, a smartphone, a mobile phone, a personal digital assistance (PDA), or the like. The terminal apparatus 14 obtains, from the information processing apparatus 10, information on the optimum lifetimes, determined by the information processing apparatus 10, of the PM replacement components with respect to the respective multifunction peripherals 12 to perform output such as display.

The network N1 of the information processing system 1 illustrated in FIG. 1 may be a wired communication network or a wireless communication network. Further, the information processing system 1 in FIG. 1 is an example of a system configuration, and the present disclosure is not limited to this. For example, the information processing apparatus 10 may be structured with a plurality of separated computers. Further, the information processing system 1 may include a plurality of information processing apparatuses 10.

<Hardware Configuration>

The information processing apparatus 10 and the terminal apparatus 14 may be implemented by one or more computers having hardware elements as illustrated in FIG. 2, for example. FIG. 2 is a block diagram illustrating an example of a hardware configuration of a computer 500.

As shown in FIG. 2, the computer 500 includes an input device 501, a display device 502, an external I/F 503, a RAM 504, a ROM 505, a CPU 506, a communication I/F 507, and a hard disk drive (HDD) 508 that are interconnected via a bus B. In some embodiments, the input device 501 and the display device 502 may be connected to the computer 500 when they need to be used.

The input device 501 includes a keyboard, a mouse, a touch panel, and the like. The input device 501 is used to input various operation signals by the user. The display device 502 includes a display and the like. The display device 502 displays processing results by the computer 500.

The communication I/F 507 is an interface for connecting the computer 500 to various networks such as the network N1. In this way, the computer 500 may perform data communication with other computers via the communication I/F 507.

The HDD 508 is an example of a nonvolatile storage device storing programs and data. The programs and the data that the HDD 508 stores may include an operating system (OS) that is basic software and controls overall operations of the computer 500, application software (referred to as the application hereinafter) that provides various functions under the control of the OS, and the like. The computer 500 may use, instead of the HDD 508, a drive device (for example, a solid state drive (SSD)) that uses a flash memory as a storage medium.

The external I/F 503 is an interface between the computer 500 and external devices. The external device may be a recording medium 503a, or the like. Thus, the computer 500 can read from and/or write on the storage medium 503a via the external I/F 503. The storage medium 503a may be a flexible disk, a compact disk (CD), a digital versatile disk (DVD), an SD memory card, a universal serial bus (USB) memory, or the like.

The ROM 505 is an example of a nonvolatile semiconductor memory (storage device) that can store programs and data even when the power is turned off. The ROM 505 stores programs and data such as a basic input/output system (BIOS) to be executed when the computer 500 is started, OS settings, network settings, and the like. The RAM 504 is an example of a volatile semiconductor memory (storage device) that temporarily stores programs and data.

The CPU 506 includes an arithmetic and logic unit that reads programs and/or data from the storage device such as the ROM 505 and/or the HDD 508, loads the programs and/or the data in the RAM 504, and executes processes according to the programs and/or the data to implement the functions and the overall control of the computer 500.

The print client apparatus 10 and the print server apparatus 12 may implement various processes as described below using, for example, the above described hardware configuration of the computer 500 illustrated in FIG. 2.

<<Multifunction Peripheral>>

The multifunction peripheral 12 illustrated in FIG. 1 may be implemented by a hardware configuration illustrated in FIG. 3, for example. FIG. 3 is a block diagram illustrating an example of the hardware configuration of the multifunction peripheral 12 according to the first embodiment. The multifunction peripheral 12 includes a controller 601, an operation panel 602, an external I/F 603, a communication I/F 604, a printer 605, a scanner 606 and the like. It should be noted that the plurality of multifunction peripherals 12 illustrated in FIG. 1 may have the same elements.

The controller 601 includes a CPU 611, a RAM 612, a ROM 613, a non-volatile RAM (NVRAM) 614, a HDD 615, and the like. The ROM 613 stores various programs and data. The RAM 612 temporarily stores programs and data. The NVRAM 614 may store setting information, for example. The HDD 615 stores various programs and data.

The CPU 611 may read programs, data, and/or setting information from the ROM 613, the NVRAM 614, and/or the HDD 615, loads the programs, the data, and/or the setting information in the RAM 612, and executes processes according to the programs, the data, and/or the setting information to implement the functions and the overall control of the multifunction peripheral 12.

The operation panel 602 includes an input unit that receives an input from the user, and a display unit that displays information. The external I/F 603 is an interface between the multifunction peripheral 12 and external devices. The external device may be a recording medium 603a, or the like. In this way, the multifunction peripheral 12 may perform read/write operations on the recording medium 603a via the external I/F 603. The recording medium 603a may be an IC card, a flexible disk, a CD, a DVD, an SD memory card, a USB memory, or the like.

The communication I/F 604 is an interface for connecting the multifunction peripheral 12 to the network N1. In this way, the multifunction peripheral 12 can establish data communication via the communication I/F 604. The printer 605 is a printing device for printing print data onto sheets (paper). The scanner 606 is a reading device for reading image data (electric data) from documents.

<Software Configuration>

<<Information Processing Apparatus>>

The information processing apparatus 10 according to the first embodiment may be implemented by processing blocks (elements) illustrated in FIG. 4, for example. FIG. 4 is a block diagram illustrating an example of the processing blocks (elements) of the information processing apparatus 10 according to the first embodiment.

The information processing apparatus 10 implements an usage status information obtaining unit 21, a failure data obtaining unit 22, a failure rate calculating unit 23, a lifetime change instruction receiving unit 24, a leading variable specifying unit 25, a lifetime matrix creating unit 26, a lifetime outputting unit 27, a use status information storage unit 31, a failure data storage unit 32, and a lifetime matrix storage unit 33 by executing one or more programs.

The usage status information obtaining unit 21 obtains use status information that is a plurality of variables relating to the multifunction peripherals 12, and causes the use status information storage unit 31 to store the use status information. The failure data obtaining unit 22 obtains failure data of the PM replacement components of the multifunction peripherals 12, and causes the failure data storage unit 32 to store the failure data of the PM replacement components.

The failure rate calculating unit 23 reads, from the failure data storage unit 32, the failure data of the PM replacement components whose failure rate is to be calculated. Then, the failure rate calculating unit 23 calculates a failure rate for each PM replacement component with respect to some variable (for example, the number of printing sheets). For example, the failure rate calculating unit 23 can read the failure data of the PM replacement components that the respective multifunction peripherals 12 include.

The lifetime change instruction receiving unit 24 receives an instruction to change a lifetime of the PM replacement component from the user. The leading variable specifying unit 25 specifies, based on the use status information read from the use status information storage unit 31 and the failure data of the PM replacement component read from the failure data storage unit 32, a plurality of leading variables with respect to some variable (for example, the number of printing sheets).

The plurality of leading variables (strong variables) are variables relevant to the lifetime of the PM replacement component. In other words, the leading variables are relevant to the lifetimes of the PM replacement components that the respective multifunction peripherals 12 include. The leading variable specifying unit 25 may specify the plurality of leading variables having high relevancy to the lifetime of the PM replacement component and may not specify one or more variables that do not have high relevancy to the lifetime of the PM replacement component. The leading variable specifying unit 25 uses graphs, an empirical rule, the Weibull decision tree analysis and/or the like to specify, from candidates for leading variables, the plurality of leading variables as described later.

The lifetime matrix creating unit 26 divides (classifies) values of the leading variables into a plurality of pieces, and calculates lifetimes of the PM replacement component with respect to respective combinations of the classified values of the leading variables to create a lifetime matrix as described later. In the lifetime matrix, the lifetimes of the PM replacement component are set with respect to the respective combinations of classified values of the leading variables. More specifically, for example, the lifetime matrix creating unit 26 classifies the values of each of the leading variables into sections to create the lifetime matrix in which the lifetimes of the PM replacement components that the respective multifunction peripherals 12 include are set with respect to combinations of the sections each of which relates to a different leading variable. The lifetime matrix creating unit 26 causes the lifetime matrix storage unit 33 to store the created lifetime matrix.

Based on the lifetime matrix read from the lifetime matrix storage unit 33 and the use status information read from the use status information storage unit 31, the lifetime outputting unit 27 determines, as described later, a lifetime of the PM replacement component with respect to each multifunction peripheral 12 to perform output such as displaying.

<Details of Processes>

In the following, details of processes of the information processing system 1 according to the first embodiment will be described.

<<Acquisition of Failure Data>>

For example, as illustrated in FIG. 5, the failure data obtaining unit 22 obtains failure data of a PM replacement component. In other words, the failure data obtaining unit 22 obtains the failure data of the PM replacement component that each multifunction peripheral 12 includes. FIG. 5 is a diagram of an example illustrating the failure data of the PM replacement components with respect to the respective multifunction peripherals 12 (A to N). FIG. 5 illustrates, with respect to each multifunction peripheral 12 (A to N), the number of printing sheets until the corresponding PM replacement component is replaced due to malfunction (failure), the number of printing sheets (the survival number of sheets) until the corresponding PM replacement component is replaced by the preventive maintenance, and the number of printing sheets (the survival number of sheets) at the time of investigation. As illustrated in FIG. 5, the PM replacement component of the multifunction peripheral A has been replaced two times (replacement due to malfunction (failure) and replacement based on the preventive maintenance). Further, the PM replacement component of the multifunction peripheral B has been replaced one time based on the preventive maintenance, and the PM replacement component of the multifunction peripheral C has not been replaced. The failure data may include information that represents whether the PM replacement components, which the respective multifunction peripherals 12 include, have been replaced.

<<Determination of a Lifetime of the PM Replacement Component>>

The information processing apparatus 10 determines the lifetime of the PM replacement component, for example, according to procedures of a flowchart illustrated in FIG. 6 to perform output. FIG. 6 is a flowchart illustrating an example of processes for determining and outputting the lifetime of the PM replacement component. As an example of a failure rate relating to some variable, FIG. 6 illustrates an example in which a failure rate with respect to the number of printing sheets is handled. In step S11, the failure rate calculating unit 23 calculates, from the failure data illustrated in FIG. 5 for example, a failure rate with respect to the number of printing sheets to make a graph as illustrated in FIG. 7. FIG. 7 is a graph illustrating an example of the failure rates with respect to the number of printing sheets.

FIG. 7 illustrates an example in which a lifetime (lifetime number of sheets) of the PM replacement component determined by product standards is 200K (K=1000) sheets. From a transition of the failure rates illustrated in FIG. 7, the lifetime change instruction receiving unit 24 sets a new lifetime (new lifetime number of sheets) of the PM replacement component in a range in which the failure rate does not changes (in a range in which a change ratio of the failure rate does not exceed a predetermined value). As illustrated in FIG. 7, 250K, at which the failure rate does not increase with respect to the current lifetime number of sheets, is set as the new lifetime number of sheets. 1though FIG. 7 illustrates the example in which the lifetime is prolonged, the lifetime may be shortened.

The setting of the new lifetime number of sheets of the PM replacement component may be performed in response to an event in which the lifetime change instruction receiving unit 24 receives an instruction to change the lifetime from the user. Further, from the transition of the failure rates illustrated in FIG. 7, the lifetime change instruction receiving unit 24 may automatically set the new lifetime number of sheets of the PM replacement component in the range in which the failure rate does not changes.

When a change of the lifetime number of sheets is present (Yes in step S12), the lifetime change instruction receiving unit 24 requests the leading variable specifying unit 25 to specify (select) leading variables. When a change of the lifetime number of sheets is not present (No in step S12), the lifetime change instruction receiving unit 24 does not request the leading variable specifying unit 25 to specify (select) leading variables. Accordingly, when the change of the lifetime number of sheets is not present, the processes of the flowchart illustrated in FIG. 6 end.

In step S13, the leading variable specifying unit 25, which is requested to specify the leading variables, specifies, from candidates for leading variables, a plurality of leading variables with respect to the number of printing sheets. For example, the leading variable specifying unit 25 reads use status information as illustrated in FIG. 8 from the use status information storage unit 31. FIG. 8 is a table illustrating an example of the use status information that represents use states of the multifunction peripherals 12. Further, the leading variable specifying unit 25 reads the failure data of the PM replacement component illustrated in FIG. 7 from the failure data storage unit 32.

For example, the leading variable specifying unit 25 divides (classifies) values of each of the leading variable candidates into three (within ±30% of an average value of market failure data, less than −30%, and greater than +30%). Specifically, for example, the leading variable specifying unit 25 divides (classifies) values of the ACV, values of the number of sheets S/J, and the like. Then, the leading variable specifying unit 25 creates graphs of the lifetime number of sheets of the PM replacement component as illustrated in FIG. 9. and FIG. 10, for example.

FIG. 9 is a graph illustrating an example of relation between the ACV and the lifetime number of sheets. FIG. 10 is a graph illustrating an example of relation between the number of sheets S/J and the lifetime number of sheets. FIG. 9 and FIG. 10 depict graphs of the lifetime number of sheets determined by products standards of the PM replacement component, graphs of the lifetime number of sheets of "B10", and graphs of the lifetime number of sheets of "B50". In FIG. 9 and FIG. 10, the lifetime number of sheets of the "B10" represents the number of printing sheets until 10% of the PM replacement components fail by reliability engineering. The lifetime number of sheets of the "B50" represents the number of printing sheets until 50% of the PM replacement components fail by reliability engineering.

The leading variable specifying unit 25 compares the graphs, of the lifetime number of sheets of the PM replacement component and the values of the leading variable candidates as illustrated in FIG. 9 and FIG. 10, and specifies leading variable candidates each of which has a large difference (inclination of the graph is large) between the upper limit value of the lifetime number of sheets and the lower limit value of the lifetime number of sheets as leading variables. In other words, the leading variable specifying unit 25 may specify the leading variables with reference to sections (pieces) into which the values of each of the leading variable candidates are classified. Each of the specified leading variables has a difference (inclination of the graph) between the upper limit value and the lower limit value. FIG. 11 depicts graphs illustrating an example of relation between the values of the three leading variable candidates and the lifetime number of sheets of the PM replacement component.

In the graph illustrated in FIG. 11, the ACV and the number of sheets S/J are specified as the leading variables because the difference between the upper limit of the lifetime number of sheets and the lower limit of the lifetime number of sheets of the ACV and the difference between the upper limit of the lifetime number of sheets and the lower limit of the lifetime number of sheets of the number of sheets S/J are larger than the difference between the upper limit of the lifetime number of sheets and the lower limit of the lifetime number of sheets of the coverage. In step S14, the lifetime matrix creating unit 26 divides (classifies) the values of the ACV specified as the leading variable into three sections, and divides (classifies) the values of the number of sheets S/J specified as the leading variable into three sections. Then, the lifetime matrix creating unit 26 calculates a lifetime number of sheets of the PM replacement component with respect to 3×3 combinations to create a lifetime matrix illustrated in FIG. 12. In other words, the lifetime matrix creating unit 26 calculates the lifetimes of the PM replacement components (component A) of the multifunction peripherals 12 to be set in the lifetime matrix. It should be noted that the components whose lifetimes are set in the lifetime matrix may be identical with each other (in this case, each multifunction peripheral 12 includes the component A).

FIG. 12 is an example of the lifetime matrix. As an example, the lifetime matrix illustrated in FIG. 12 has a structure in which the values of the ACV and the values of the number of sheets S/J are respectively divided (classified) into three sections (within ±30% of an average value of market failure data, less than −30%, and greater than +30%). As illustrated in FIG. 12, the new lifetime number of sheets is set at a position corresponding to a combination of the section of the ACV within ±30% of the average value of the market failure data and the section of the number of sheets S/J within ±30% of the average value of the market failure data. In other words, the lifetime matrix creating unit 26 may use a structure having rows into which the values of the ACV (first leading variable) are classified and columns into which the values of the number of sheets S/J (second leading variable) are classified to create the lifetime matrix in which the lifetimes of the components of the respective multifunction peripherals 12 are set with respect to the combinations of the rows and the columns.

The lifetime matrix in FIG. 12 is an example, and this is not intended to limit the lifetime matrix of the first embodiment to the 3×3 matrix. For example, the lifetime matrix in FIG. 12 may be a three or more dimensional matrix. Further, division (classification) of the values of the leading variables may be division in order not to make distributions of the multifunction peripherals 12 drastic, division by a calculation amount, or division by user settings.

According to similar procedures, the lifetime matrix creating unit 26 creates, as illustrated in FIG. 13, lifetime matrixes of PM replacement components B to E of the multifunction peripheral A, and lifetime matrixes of PM replacement components A to E of the multifunction peripherals B to X. In other words, the lifetime matrix creating unit 26 may create the lifetime matrixes for the respective components (A to E) that each of the multifunction peripherals 12 (A to X) includes in order to determine the lifetimes of the respective components (A to E) with respect to each of the multifunction peripherals 12 (A to X).

Referring back to FIG. 6, in step S15, the lifetime outputting unit 27 determines, based on the lifetime matrix in FIG. 12 and the use status information in FIG. 8 read from the use status information storage unit 31 for example, a combination (value) to which the multifunction peripheral 12 belongs in the lifetime matrix. The new lifetime number of sheets of the multifunction peripheral 12 becomes a new lifetime number of sheets set in the combination to which the multifunction peripheral 12 is determined to belong. At this time, the lifetime outputting unit 27 may determine the lifetimes of the PM replacement components of the respective multifunction peripherals 12 by determining, based on the use states of the respective multifunction peripherals 12 and the lifetime matrix, the combinations (values) to which the respective multifunction peripherals 12 belong (correspond) in the lifetime matrix.

For example, in the use status information in FIG. 8, the value of the ACV of the multifunction peripheral A is "8.4K" and the value of the number of sheets S/J is "1.1K". Accordingly, the new lifetime number of sheets of the PM replacement component A of the multifunction peripheral A becomes "234,326" in the lifetime matrix in FIG. 12. It should be noted that the lifetime outputting unit 27 can determine the lifetimes of the PM replacement components A of the respective multifunction peripherals 12 based on the lifetime matrix in FIG. 12 and the use status information in FIG. 8.

In step S16, the lifetime outputting unit 27 can determine the new lifetime number of sheets of the PM replacement component A with respect to each multifunction peripheral 12 to perform display, transmission, faxing (fax communication), and/or printing. For example, the display of the new lifetime number of sheets may be performed by any of the information processing apparatus 10, the multifunction peripheral(s) 12, and the terminal apparatus 14. The transmission of the new lifetime number of sheets may be performed, for example, by using electronic mail, a short message, a communication application or the like. The faxing or the printing of the new lifetime number of sheets may be performed, for example, by the multifunction peripheral(s) 12 based on an instruction from the information processing apparatus 10.

In this way, the information processing apparatus 10 of the first embodiment can determine the optimum lifetime number of sheets of the PM replacement component with respect to each multifunction peripheral 12 by specifying (selecting) the plurality of the leading variables having high relevancy with the lifetime number of sheets, dividing (classifying) the values of the leading variables into the plurality of sections (pieces), and calculating the lifetime number of sheets with respect to each combination of the sections.

For example, the customer engineer can perform maintenance in accordance with an optimum lifetime number of sheets determined with respect to each multifunction peripheral 12. The customer engineer can determine an optimum lifetime date of the PM replacement component from the optimum lifetime number of sheets, the cumulative number of printing sheets of the use status information of FIG. 8, and the number of printing sheets per day (sheets/day).

For example, in a case in which the optimum lifetime number of sheets is "234,326" and the cumulative number of printing sheets is "200K", and the number of printing sheets per day is "10K", the customer engineer can determine that the optimum lifetime date of the PM replacement component is three days after.

The customer engineer may be required to perform the maintenance to replace the PM replacement component until the determined optimum lifetime date. The customer engineer performs the maintenance to replace the PM replacement component, for example, by plus one maintenance, moving a schedule maintenance date, or emergency maintenance.

The plus one maintenance is to perform the maintenance to replace the PM replacement component on the schedule maintenance date scheduled for performing schedule maintenance in advance. The schedule maintenance is maintenance to be performed on the schedule maintenance date. The schedule maintenance date may be scheduled in advance. The emergency maintenance is maintenance to be performed urgently on a date other than the schedule maintenance date.

For example, in order to perform the maintenance to replace the PM replacement component based on the newly determined optimum lifetime date, the lifetime outputting unit 27 may execute processes of a flowchart illustrated in FIG. 14. As illustrated in FIG. 14, the lifetime outputting unit 27 can determine whether to perform the plus one maintenance, to move the schedule maintenance date, or to perform the emergency maintenance, and output the determination.

FIG. 14 is a flowchart illustrating an example for selecting the maintenance in accordance with the optimum lifetime date. In step S21, the lifetime outputting unit 27 determines whether the schedule maintenance date is before the newly determined optimum lifetime date. When the schedule maintenance date is before the newly determined optimum lifetime date (Yes in step S21), the lifetime outputting unit 27 determines in step S22 to perform the plus one maintenance and outputs its contents.

When the schedule maintenance date is not before the newly determined optimum lifetime date (No in step S21), the process goes to step S23. Then, the lifetime outputting unit 27 determines whether the schedule maintenance date can be moved (to be) before the newly determined optimum lifetime date. When the schedule maintenance date can be moved before the newly determined optimum lifetime date (Yes in step S23), the lifetime outputting unit 27 determines in step S24 to perform the maintenance by moving the schedule maintenance date, and outputs its contents. When the schedule maintenance date cannot be moved before the newly determined optimum lifetime date (No in step S23), the lifetime outputting unit 27 determines in step S25 to perform the emergency maintenance, and outputs its contents.

<Review>

According to the first embodiment, the lifetime of the PM replacement component can be determined with respect to each multifunction peripheral 12 depending on a way of using the corresponding multifunction peripheral 12. Thus, according to the first embodiment, because the lifetime of the PM replacement component determined by the product standards can be prolonged without increasing the failure rate, the component cost and the service work cost (maintenance cost) can be reduced.

Further, according to the first embodiment, because PM replacement components having excessive quality can be found, it becomes possible to reduce costs by reducing the quality of the PM replacement components. Moreover, according to the first embodiment, PM replacement components having short lifetimes can be found. Then, the PM replacement components having short lifetimes can be improved in order to effectively reduce failure rates. It becomes possible to propose how to reduce the failure rate based on the lifetime matrix illustrated in FIG. 12 to users who use the multifunction peripherals 12.

Second Embodiment

In the first embodiment, the graphs, of the values of the leading variables candidates and the lifetime number of sheets of the PM replacement component, are compared to specify, as the leading variables, the leading variables candidates each of which has a large difference (inclination of the graph is large) between the upper limit and the lower limit of the lifetime number of sheets. In a second embodiment, a Weibull decision tree analysis is used to determine the lifetime of the PM replacement component with respect to each multifunction peripheral 12 depending on a way of using the multifunction peripheral 12. Because the second embodiment is similar to the first embodiment except for a part of the second embodiment, its descriptions may be omitted as appropriate.

First, the leading variable specifying unit 25 divides (classifies) the use status information, read from the use status information storage unit 31, on each multifunction peripheral 12 and failure data, read from the failure data storage unit 32, of the PM replacement component of each multifunction peripheral 12 into data for learning and data for verification.

Then, the leading variable specifying unit 25 divides (classifies) the data for learning into a plurality of groups such that lifetime distributions (Weibull distributions) are most different using bifurcation parameters, and determines the lifetime number of sheets with respect to each divided group.

FIG. 15 is a diagram illustrating an example of a result of a Weibull decision tree analysis of the data for learning. In FIG. 15, "eta" indicates the lifetime number of sheets. In FIG. 15, "LOW HUMIDITY RATE" is divided by a bifurcation parameter "0.5494". After that, a "LOW HUMIDY RATE<0.5494" part is divided by a bifurcation parameter "8368.0000" of "ACV" in FIG. 15. In FIG. 15, a "ACV<8368.0000" part is further divided by a bifurcation parameter "0.0143" of "OPERATION RATE". In this way, 4 divided groups ("GROUPS 1 to 4") are illustrated in FIG. 15.

Because the bifurcation parameters in FIG. 15 can be automatically determined (analyzed) by software that performs the Weibull decision tree analysis, their descriptions are omitted. FIG. 16 depicts graphs illustrating examples of failure rates with respect to the number of printing sheets after the data for learning is divided by the low humidity rate, the ACV, and the operation rate.

A graph 1000 in FIG. 16 graphically illustrates the failure rate with respect to the number of printing sheets by dividing into "LOW HUMIDITY RATE<0.5494" and "LOW HUMIDITY RATE>=0.5494" (equal to or greater than 0.5494). In the graph 1000, a graph, corresponding to a case in which the humidity rate is less than 0.5494 and a graph, corresponding to a case in which the humidity rate is equal to or greater than 0.5494 are illustrated. Further, a graph 1010 graphically illustrates the failure rate with respect to the number of printing sheets by dividing the part corresponding to "LOW HUMIDITY RATE<0.5494" of the graph 1000 into "ACV<8368" and "ACV>=8368". In the graph 1010, a graph corresponding to a case in which the ACV is less than 8368 and a graph corresponding to a case in which the ACV is equal to or greater than 8368 are illustrated.

Moreover, a graph 1020 graphically illustrates the failure rate with respect to the number of printing sheets by dividing the part corresponding to "ACV<8368" of the graph 1010 into "OPERATION RATE<0.0143" and "OPERATION RATE>=0.0143". In the graph 1020, a graph corresponding to a case in which the operation rate is less than 0.0143 and a graph corresponding to a case in which the operation rate is equal to or greater than 0.0143 are illustrated.

In this way, the result of the Weibull decision tree analysis of the data for learning illustrated in FIG. 15 can be divided into 4 groups ("GROUPS 1 to 4") in which the low humidity rate, the ACV, and the operation rate are combined. The groups 1 to 4 can be divided into random failure and wear-out failure by a value of "m". The value of "m" that divides the random failure and the wear-out failure can be variously considered. Here, the group 4, whose value of "m" is equal to or less than "1", is determined as the failure rate due to the random failure. Further, the groups 1 and 3, whose values of "m" are sufficiently greater than "1", are determined as the failure rate due to the wear-out failure. Although a value of "m" of the group 2 is equal to or greater than "1", the value of "m" of the group 2 is not sufficiently greater than "1". Thus, the group 2 cannot be determined as the failure rate due to the random failure or the failure rate due to the wear-out failure.

After dividing the result of the Weibull decision tree analysis of the data for learning illustrated in FIG. 15 into 4 groups ("GROUPS 1 to 4") in which the low humidity rate, the ACV, and the operation rate are combined, the leading variable specifying unit 25 allocates (applies) data for verification to each group as illustrated in FIGS. 17A to 17D.

FIGS. 17A to 17D are graphs illustrating, for the respective groups 1 to 4, examples of the failure rates with respect to the number of printing sheets of the data for verification and the failure rates with respect to the number of printing sheets of the data for learning. In FIGS. 17A to 17D, graphs of the data for learning are represented by thick solid lines, and graphs of the data for verification are represented by squares. When a degree of coincidence between the data for learning and the data for verification is equal to or greater than a predetermined percentage, the leading variable specifying unit 25 adopts the graphs of the data for learning. As illustrated in FIG. 18, the lifetime matrix creating unit 26 calculates, with respect to each group, the lifetime number of sheets of "B20" for example.

FIG. 18 is a table illustrating an example of the lifetime number of sheets calculated for the respective groups. The lifetime number of sheets of the multifunction peripheral 12 becomes the lifetime number of sheets of a group to which the multifunction peripheral 12 is determined, from the lifetime number of sheets for the respective groups 1 to 4, to belong. The lifetimes of the PM replacement components that the respective multifunction peripherals 12 include can be determined based on the groups to which the respective multifunction peripherals 12 belong and the table illustrated in FIG. 18.

<Review>

According to the second embodiment, even if relevancy between the variables and the lifetime of the PM replacement component is not known in advance, the lifetime of the PM replacement component can be determined with respect to each multifunction peripheral 12 depending on a way of using the corresponding multifunction peripheral 12.

Third Embodiment

In a third embodiment, the variables bifurcated by the bifurcation parameters in the second embodiment may be used as the leading variables of the first embodiment. In the third embodiment, values of the variables bifurcated by the bifurcation parameters are divided (classified) into a plurality of pieces and lifetimes of the PM replacement component are calculated with respect to respective combinations to create the lifetime matrix as illustrated in FIG. 12.

The leading variable specifying unit 25 specifies the variables (the low humidity rate, the ACV, and the operation rate) bifurcated by the bifurcation parameters in the second embodiment as the leading variables. The lifetime matrix creating unit 26 divides (classifies) the values of the leading variables into the plurality of pieces (sections), and calculates lifetimes of the PM replacement component with respect to respective combinations of the classified values of the leading variables to create the lifetime matrix. The lifetime matrix creating unit 26 causes the lifetime matrix storage unit 33 to store the created lifetime matrix. Because other configuration and operation of the third embodiment are similar to those of the first embodiment, their descriptions are omitted.

<Review>

According to the third embodiment, even if relevancy between the variables and the lifetime of the PM replacement component is not known in advance, the leading variables can be specified (selected) and the lifetime of the PM replacement component can be determined with respect to each multifunction peripheral 12 depending on a way of using the corresponding multifunction peripheral 12.

Further, the present disclosure is not limited to these embodiments, but various variations and modifications may be made without departing from the scope of the present disclosure. The multifunction peripheral 12 is an example of an electric device (electronic device).

The present application is based on and claims the benefit of priority of Japanese Priority Application No. 2015-121654 filed on Jun. 17, 2015, with the Japanese Patent Office, the entire contents of which are hereby incorporated by reference.

REFERENCE SIGNS LIST 1 information processing system
10 information processing apparatus
12 multifunction peripheral
14 terminal apparatus
21 use status information obtaining unit
22 failure data obtaining unit
23 failure rate calculating unit
24 lifetime change instruction receiving unit
25 leading variable specifying unit
26 lifetime matrix creating unit
27 lifetime outputting unit
31 use status information storage unit
32 failure data storage unit
33 lifetime matrix storage unit
500 computer
501 input device
502 display device
503 external I/F
503a recording medium
504 RAM
505 ROM
506 CPU
507 communication I/F
508 HDD
601 controller
602 operation panel 603 external I/F
603a recording medium
604 communication I/F
605 printer
606 606
611 CPU
612 RAM
613 ROM
614 NVRAM
615 HDD
1000, 1010, 1012 graph
B bus
N1 network

The invention claimed is:

1. An information processing system including one or more information processing apparatuses for determining lifetimes of components, to be replaced by preventive maintenance, of respective multifunction peripherals, the information processing system comprising:
　a leading variable specifying unit configured to specify, based on variables that represent use states of the multifunction peripherals and failure data of the components of all the multifunction peripherals which have been obtained from the multifunction peripherals including the components, a plurality of leading variables relevant to the lifetimes of the components;
　a lifetime matrix creating unit configured to classify a plurality of values of each of the leading variables into sections to create a lifetime matrix in which the lifetimes of the components are set with respect to combinations of the sections each of which relates to a different leading variable; and
　a lifetime outputting unit configured to determine, based on the lifetime matrix, the lifetimes of the components with respect to the respective multifunction peripherals.

2. The information processing system according to claim 1, wherein the leading variable specifying unit is configured to classify a plurality of values of each of the variables that represent the use states of the multifunction peripherals into a plurality of pieces, and to specify, with reference to the plurality of pieces, the plurality of leading variables having differences between upper limits and lower limits of the lifetimes of the components.

3. The information processing system according to claim 1, wherein the leading variable specifying unit is configured to classify, based on the variables that represent the use states of the multifunction peripherals and the failure data of the multifunction peripherals which have been obtained from the multifunction peripherals including the components, the variables that represent the use states into a plurality of groups to make lifetime distributions of the components most different, and to set the lifetimes of the components with respect to the respective groups, and
　wherein the lifetime outputting unit is configured to determine, as the lifetimes of the components of the multifunction peripherals, the lifetimes of the components of the groups corresponding to the combinations of the sections each of which relates to the different leading variable.

4. The information processing system according to claim 1, wherein the leading variable specifying unit is configured to specify, based on the variables that represent the use states of the multifunction peripherals and the failure data of the multifunction peripherals which have been obtained from the multifunction peripherals including the components, the plurality of leading variables having most different lifetime distributions of the components.

5. The information processing system according to claim 3, wherein the leading variable specifying unit is configured to analyze the variables having most different lifetime distributions of the components using a result of a decision tree analysis.

6. The information processing system according to claim 1, wherein the lifetime outputting unit is configured to use a structure having rows and columns for the sections of the leading variables to create the lifetime matrix in which the lifetimes of the components are set with respect to the combinations of the sections each of which relates to the different leading variable.

7. The information processing system according to claim 1, wherein the failure data includes information that represents whether the components have been replaced.

8. The information processing system according to claim 1,
　wherein the leading variables includes a first leading variable and a second leading variable, and
　wherein the lifetime matrix creation unit is configured to use rows into which a plurality of values of the first leading variable are classified and columns into which a plurality of values of the second leading variable are classified to create the lifetime matrix in which the lifetimes of the components are set with respect to the combinations of the rows and the columns.

9. A component lifetime determining method for determining lifetimes of components, to be replaced by preventive maintenance, of respective multifunction peripherals, the component lifetime determining method comprising:
　specifying, based on variables that represent use states of the multifunction peripherals and failure data of the components of all the multifunction peripherals which have been obtained from the multifunction peripherals including the components, a plurality of leading variables relevant to the lifetimes of the components;
　classifying a plurality of values of each of the leading variables into sections to create a lifetime matrix in which the lifetimes of the components are set with respect to combinations of the sections each of which relates to a different leading variable; and
　determining, based on the lifetime matrix, the lifetimes of the components with respect to the respective multifunction peripherals.

10. A non-transitory recording medium for causing one or more information processing apparatuses for determining lifetimes of components, to be replaced by preventive maintenance, of respective multifunction peripherals, to execute a process, the process comprising:
　specifying, based on variables that represent use states of the multifunction peripherals and failure data of the components of all the multifunction peripherals which have been obtained from the multifunction peripherals including the components, a plurality of leading variables relevant to the lifetimes of the components;
　classifying a plurality of values of each of the leading variables into sections to create a lifetime matrix in which the lifetimes of the components are set with respect to combinations of the sections each of which relates to a different leading variable; and
　determining, based on the lifetime matrix, the lifetimes of the components with respect to the respective multifunction peripherals.

* * * * *